United States Patent
Hornung et al.

(10) Patent No.: US 8,835,704 B2
(45) Date of Patent: Sep. 16, 2014

(54) THERMAL TREATMENT OF BIOMASS

(75) Inventors: Andreas Hornung, Birmingham (GB); Andreas Apfelbacher, Birmingham (GB)

(73) Assignee: Aston University, Birmingham (GB)

( * ) Notice: Subject to any disclaimer, the term of this patent is extended or adjusted under 35 U.S.C. 154(b) by 975 days.

(21) Appl. No.: 12/992,654

(22) PCT Filed: May 14, 2009

(86) PCT No.: PCT/GB2009/001225
§ 371 (c)(1),
(2), (4) Date: Nov. 15, 2010

(87) PCT Pub. No.: WO2009/138757
PCT Pub. Date: Nov. 19, 2009

(65) Prior Publication Data
US 2011/0067991 A1 Mar. 24, 2011

(30) Foreign Application Priority Data
May 14, 2008 (GB) .................................. 0808739.7

(51) Int. Cl.
| | |
|---|---|
| *C07C 1/00* | (2006.01) |
| *C10J 3/26* | (2006.01) |
| *C10J 3/20* | (2006.01) |
| *C10J 3/66* | (2006.01) |
| *C10B 53/02* | (2006.01) |
| *C10B 51/00* | (2006.01) |
| *C10B 7/10* | (2006.01) |
| *C10B 49/16* | (2006.01) |
| *C10J 3/00* | (2006.01) |

(52) U.S. Cl.
CPC . *C10B 53/02* (2013.01); *C10J 3/26* (2013.01); *C10J 3/20* (2013.01); *C10J 3/66* (2013.01); *C10J 2300/0956* (2013.01); *C10J 2300/0916* (2013.01); *Y02E 50/14* (2013.01); *C10J 2200/09* (2013.01); *C10B 51/00* (2013.01); *C10B 7/10* (2013.01); *C10B 49/16* (2013.01); *C10J 2300/094* (2013.01); *C10J 3/007* (2013.01)
USPC .................. 585/240; 201/2.5; 201/3; 201/22; 202/117; 202/118; 202/262; 202/265

(58) Field of Classification Search
USPC ............ 585/240, 242; 201/2.5, 3, 22; 202/96, 202/117, 118, 262, 265
See application file for complete search history.

(56) References Cited

U.S. PATENT DOCUMENTS

| 4,153,514 | A | * | 5/1979 | Garrett et al. .................. 201/2.5 |
| 4,308,034 | A | * | 12/1981 | Hoang ............................ 48/111 |

(Continued)

FOREIGN PATENT DOCUMENTS

| WO | 02/50484 | 6/2002 |
| WO | 2004/072207 | 8/2004 |
| WO | 2007/128798 | 11/2007 |

OTHER PUBLICATIONS

Bridgwater, A.V. et al., "Renewable fuels and chemicals by thermal processing of biomass," Chemical Engineering Journal, vol. 91, 2003, pp. 87-102.

(Continued)

*Primary Examiner* — Nina Bhat
(74) *Attorney, Agent, or Firm* — Alston & Bird LLP (57) ABSTRACT

A biomass pyrolysis process is provided in which biomass feedstock is mixed with a heat carrier. The heat carrier at least partly comprises char. The ratio by weight of biomass to char is in the range 1:1 to 1:20. The process may be carried out by in a screw/auger pyrolysis reactor in which the solid feedstock components are conveyed along the reactor by a first screw. A second screw conveys at least a portion of the solid products of the biomass pyrolysis back to a heat transfer medium input port. Thus, the heat transfer medium includes char from the biomass pyrolysis.

14 Claims, 8 Drawing Sheets

(56) References Cited

U.S. PATENT DOCUMENTS

| | | | | |
|---|---|---|---|---|
| 5,258,101 | A | * | 11/1993 | Breu .................................. 202/131 |
| 5,961,786 | A | * | 10/1999 | Freel et al. ...................... 202/121 |
| 7,000,551 | B2 | * | 2/2006 | Cole et al. ....................... 110/336 |
| 8,057,641 | B2 | * | 11/2011 | Bartek et al. ...................... 201/12 |
| 8,105,482 | B1 | * | 1/2012 | Freel et al. ...................... 208/411 |
| 8,137,508 | B2 | * | 3/2012 | Grispin ............................ 201/25 |
| 8,499,702 | B2 | * | 8/2013 | Palmas et al. ................... 110/341 |
| 2004/0035788 | A1 | | 2/2004 | Schmid et al. |
| 2010/0163395 | A1 | * | 7/2010 | Henrich et al. ................. 201/2.5 |

OTHER PUBLICATIONS

International Search Report and Written Opinion from PCT/GB09/001225 dated Feb. 23, 2010.

* cited by examiner

THERMAL TREATMENT OF BIOMASS

CROSS REFERENCE TO RELATED APPLICATIONS

The present application is the U.S. national phase entry of PCT/GB09/001,225 with an international filing date of May 14, 2009, which claims the benefit of British Patent Application No. 0808739.7, filed on May 14, 2008, the entire disclosures of which are incorporated herein by reference.

BACKGROUND TO THE INVENTION

1. Field of the Invention

The present invention relates to the thermal treatment of biomass. It has particular, but not exclusive, application to biomass pyrolysis reformers for the production of renewable gaseous and solid fuels from biomass.

2. Related Art

Biomass pyrolysis is the thermal decomposition of biomass (e.g. plant material such as wood and wood bark) substantially in the absence of oxygen. Biomass is typically a mixture of hemicellulose, cellulose, lignin and small amounts of other organics. These components typically pyrolyse or degrade at different rates and by different mechanisms and pathways.

One traditional example of biomass pyrolysis is the production of charcoal, where the main product of the pyrolysis is char. Alternative biomass pyrolysis techniques provide a product which, after cooling, includes a substantial proportion of liquid. This liquid is typically a dark brown liquid having a heating value that is around one half the heating value of conventional fuel oil. The liquid is typically referred to as bio-oil. In some circumstances, it is the bio-oil which is the most valuable product of the pyrolysis reaction, since bio-oil can be easily stored for later use, e.g. for heat and/or electricity generation. However, in other circumstances, the gas products may be more useful, e.g. in rural locations for combined heat and power (CHP) applications where the gas may be used to produce electricity.

The rate and extent of decomposition of the components of biomass depends on the process parameters of the pyrolysis reactor. In turn, these process parameters may also have an effect on the subsequent behaviour of the product, e.g. by secondary reactions such as cracking (of higher molecular mass products) or condensation reactions (of lower molecular mass products).

In order to produce a high proportion of gas phase by a pyrolysis process, it is typical to carry out a gasification-type pyrolysis process. In such a gasification process, it is typical to heat the solid biomass to 300-600° C. to achieve pyrolysis of the biomass, the products of which are solid char, condensable organic compounds (including tar), water and gases. Subsequently in the process, reactions are promoted above about 700° C. (typically at around 800° C.) to decrease the liquid (vapour) concentration to produce further useful gas phase products, and also to gasify some of the char via gas-solid and gas-gas interactions. There are several different types of gasifier reactor types that have been characterised. See, for example, A. V. Bridgwater ("Renewable fuels and chemicals by thermal processing of biomass" Chemical Engineering Journal Volume 91, Issues 2-3, 15 Mar. 2003, pages 87-102), which disclosure briefly reviews the characteristics of the following gasifier reactor types: downdraft fixed bed, updraft fixed bed, bubbling fluid bed, circulating fluid bed, entrained flow, twin fluid bed, screw/auger kiln, rotary kiln, cyclonic and vortex.

In each of the gasifier reactor types indicated above, it is necessary to provide a heat transfer medium in order to achieve rapid and efficient heating of the biomass feedstock and the products of pyrolysis to promote gasification. Typically particles such as sand are used as the heat transfer medium.

WO 02/50484 discloses an apparatus for the thermal treatment of material. It is primarily intended for the recycling of electronics waste material, but can also be used for the thermal treatment of biomass. WO 02/50484 discloses a screw kiln in which thermally conductive particles are provided in the feedstock. These particles are spheres of metal, ceramics or SiC. Primarily they have the function of cleaning the interior surface of the screw kiln. On exiting the kiln, the thermally conductive particles may be re-used by being conducted back to the entrance to the kiln along a hollow shaft of the kiln.

SUMMARY OF THE INVENTION

The present inventors have realised that particular advantages may be gained by using a high proportion of char in the pyrolysis process.

Accordingly, in a first preferred aspect, the present invention provides a biomass pyrolysis process in which biomass feedstock is mixed with a heat carrier, the heat carrier at least partly comprising char, the ratio by weight of biomass to char being 1:1 to 1:20.

The present inventors consider that the use of high proportions of char to biomass promotes the formation of synthesis gas (syngas—a mixture of CO and $H_2$) and the formation of lower organics. In general, the use of high proportions of char are considered to reduce the vapour (liquid) phase proportion of the pyrolysis products. Surprisingly, this is advantageous in some circumstances, such as in combined heat and power (CHP) applications.

Preferred or optional features of the first aspect of the invention will now be set out. These may be combined either singly or in any combination, unless the context demands otherwise.

Preferably the process is a continuous (or quasi-continuous) one and the ratio by weight of biomass to char is the steady state ratio of these components during the process.

The upper limit for the ratio by weight of biomass to char may more preferably be 1:1.5 or less or, more preferably still, 1:2 or less.

The lower limit of the ratio by weight of biomass to char may more preferably be 1:15 or more or, more preferably still, 1:10 or more or 1:5 or more.

Preferably, the process uses a pyrolysis reactor in which the solid feedstock components are conveyed along the reactor. For example, the pyrolysis reactor may be a screw/auger kiln.

Alternatively, the process may use a pyrolysis reactor in which a bed of biomass and heat carrier is mixed but not conveyed during the pyrolysis reaction.

Preferably the process is operated at a temperature of 600° C. or lower. This is significantly lower than typical gasification temperatures (typically around 800° C.) and yet the gas phase products of the process are preferably comparable to the gas phase products of gasification.

In order to provide a high proportion of char relative to biomass in the process, it is preferred to recycle at least some of the char that is produced in the pyrolysis process itself. One benefit of this is that the char can remain hot from its formation by the biomass process and thus can make a significant contribution to the transfer of heat to the new biomass for pyrolysis. Thus, the char can form part (or indeed all, in some circumstances) of the heat carrier for the pyrolysis process. Alternatively it is possible to store char for later use in the reactor. The disadvantage of this is that the requirement to heat the char will reduce the efficiency of the overall process.

Similar comments apply to ash formed in the pyrolysis process—the heat carrier in subsequent pyrolysis processes may comprise ash, at least in part. However, it is considered that ash does not play so significant a role in the pyrolysis process as char, since it is considered that a part of the char is consumed in the reformation reaction:

$$C + H_2O \rightarrow CO + H_2$$

for the production of synthesis gas, or syngas. Syngas has a lower heating value than methane (natural gas) for example, but still provides a useful and convenient fuel for the subsequent generation of electricity in combined heat and power (CHP) apparatus.

The present inventors have realised that this use of one or more solid products of the biomass pyrolysis process as all or part of a heat transfer medium constitutes a separate, independent aspect of the invention, which may be combined with the first aspect, and any other aspects, of the invention.

Thus, in a second aspect, the present invention provides a biomass pyrolysis process including the steps:
conveying biomass feedstock and heat transfer medium from respective biomass feedstock and heat transfer medium input ports through a pyrolysis zone of a biomass pyrolysis apparatus to produce at least solid and gaseous biomass pyrolysis products; and
conveying at least a portion of the solid products from an output port of the apparatus back to the heat transfer medium input port.

In a third aspect, the present invention provides a biomass pyrolysis apparatus having:
a biomass feedstock input port;
a heat transfer medium input port;
a first conveying means for conveying the biomass feedstock and heat transfer medium through a pyrolysis zone of the apparatus;
an output port for solid products of the biomass pyrolysis; and
a second conveying means for conveying at least a portion of the solid products of the biomass pyrolysis back to the heat transfer medium input port, so that the heat transfer medium includes said solid products of the biomass pyrolysis.

Preferably, the first and second conveying means are located with respect to each other so that one of them surrounds at least a part of the other. In this way, the heat of the second conveying means may serve at least partially to heat or insulate the first conveying means. For example, the second conveying means may be disposed annularly around the first conveying means. Alternatively, the first and second conveying means may be located adjacent one another.

It is specifically envisaged that the second or third aspects may be combined with the first aspect, including with any combination of preferred or optional features of the first aspect.

Still further preferred or optional features are set out below, these being combinable in any combination with any aspect of the invention, unless the context demands otherwise.

It is preferred that not all of the char produced in the biomass pyrolysis process is recycled into the biomass pyrolysis process. Preferably 90% or less (by weight), more preferably 80% or less, 70% or less, 60% or less or 50% or less is recycled into the biomass pyrolysis process. At least a portion of the remaining char may be combusted, in order to provide heat for the biomass pyrolysis process. Preferably, at least 10% of the char (by weight) is combusted in this way, more preferably at least 20%, at least 30%, at least 40% or at least 50%.

At least a portion of the products of the pyrolysis process may be conveyed to a gasifier apparatus. Preferably the gasifier apparatus operates at a temperature of at least 700° C. (typically about 800° C.). Preferably the gas and/or vapour products of the pyrolysis process are conveyed to the gasifier. Optionally, further biomass is introduced into the gasifier. The gasifier is preferably a fluidised bed gasifier. Alternatively, a downdraft gasifier may be used. Preferably the biomass introduced into the gasifier is low ash biomass, such as wood (but preferably not wood bark). Low ash biomass is preferred, in order to avoid corrosion and/or blockage of the fluidised bed.

For example, an outlet of the pyrolysis apparatus may be connected to an inlet of the gasifier apparatus. In this way, the vapour products of the pyrolysis apparatus may be provided at the pyrolysis zone of the gasifier apparatus. The vapour products of the pyrolysis apparatus may be substantially ash-free. This may provide efficiency benefits to the gasification process.

The pyrolysis apparatus may operate at an internal pressure above atmospheric pressure. For example, the pyrolysis apparatus may operate at least 3 mbar over atmospheric pressure (typically at least 50, or 200-300 mbar over atmospheric pressure, or in some cases up to about 30 bar over atmospheric pressure). This allows the vapour pyrolysis products effectively to be pumped into the gasifier apparatus, driven by the over pressure.

BRIEF DESCRIPTION OF THE DRAWINGS

Preferred embodiments of the present invention will now be described, by way of example, with reference to the accompanying drawings, in which.

DETAILED DESCRIPTION OF THE PREFERRED EMBODIMENTS, AND FURTHER PREFERRED AND/OR OPTIONAL FEATURES

It is known that biomass pyrolysis products are complex mixtures of different compounds. It is typical for the liquid (vapour) phases of biomass pyrolysis to include an oily phase with relatively low water content and a water-based phase with relatively high water content.

Figure 1:
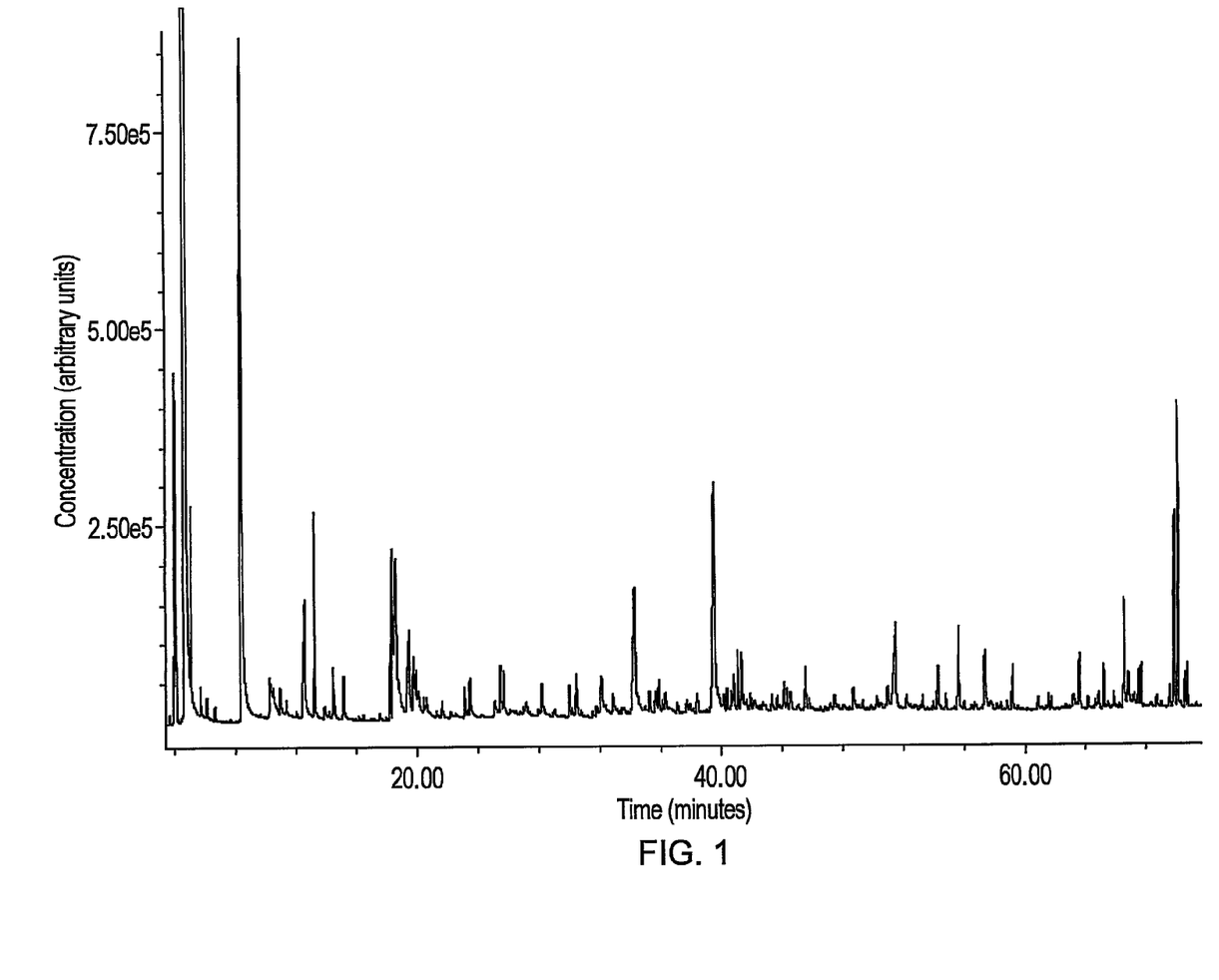
FIG. 1 shows a gas chromatography spectrum for the water-based phase product of a rapeseed biomass pyrolysis process, in which the abscissa is in units of time (minutes) and the ordinate is in arbitrary units of concentration.

FIG. 1 shows a gas chromatography spectrum for the water-based phase of a biomass pyrolysis product in which the biomass was rapeseed, pyrolysed by an intermediate pyrolysis process. The water content of the water-based phase was determined to be 80.42%. The results of analysis of the spectrum are set out in the following Tables 1 and 2:

TABLE 1

Summary of water-based phase

| Substance group | wet oil wt. % | dry oil wt. % |
|---|---|---|
| Acids | 2.031 | 10.372 |
| Nonaromatic Alcohols | 0.000 | 0.000 |
| Nonaromatic Aldehydes | 0.000 | 0.000 |
| Nonaromatic Ketones | 0.100 | 0.511 |
| Furans | 0.086 | 0.438 |
| Pyrans | 0.000 | 0.000 |
| Sugars | 0.382 | 1.949 |

TABLE 1-continued

Summary of water-based phase

| Substance group | wet oil wt. % | dry oil wt. % |
|---|---|---|
| Benzene | 0.000 | 0.000 |
| Catechols | 0.020 | 0.103 |
| Aromatic Aldehydes | 0.000 | 0.000 |
| Aromatic Ketones | 0.000 | 0.000 |
| Lignin derived Phenols | 0.012 | 0.061 |
| Guaiacols/Methoxy phenols | 0.000 | 0.000 |
| Syringols/Dimethoxy phenols | 0.028 | 0.144 |
| Miscellaneous | 0.000 | 0.000 |
| Total | 2.659 | 13.579 |

TABLE 2

Detailed analysis of water-based phase

| Compound | Wet oil wt. % | Dry oil wt. % |
|---|---|---|
| Acids | 2.031 | 10.372 |
| Acetic acid | 1.598 | 8.161 |
| Propanoic acid | 0.355 | 1.815 |
| Propanoic acid, 2-methyl- * | 0.015 | 0.076 |
| poss: Acid compound: base mass 60, MW ? ** | 0.021 | 0.105 |
| Pentanoic acid, 3-methyl- ** | 0.006 | 0.030 |
| Pentanoic acid, 4-methyl- ** | 0.016 | 0.079 |
| poss: Hexenoic acid ** | 0.005 | 0.027 |
| unknown aliphatic acid, MW = ? ** | 0.005 | 0.028 |
| poss: Heptenoic acid ** | 0.010 | 0.052 |
| Nonaromatic Alcohols | 0.000 | 0.000 |
| Nonaromatic Aldehydes | 0.000 | 0.000 |
| Nonaromatic Ketones | 0.100 | 0.511 |
| Butanone, 2- | 0.010 | 0.049 |
| 3-Pentene-2-one, 4-methyl- * | 0.041 | 0.207 |
| Diacetone alcohol (Inpurity from Acetone) * | 0.017 | 0.088 |
| 2-Cyclopenten-1-one, 2-hydroxy-3-methyl-; MCP; Cycloten | 0.033 | 0.166 |
| Furans | 0.086 | 0.438 |
| Furfuryl alcohol, 2- | 0.056 | 0.287 |
| Butyrolactone, γ- | 0.022 | 0.112 |
| lacton derivative | 0.008 | 0.040 |
| Pyrans | 0.000 | 0.000 |
| Sugars | 0.382 | 1.949 |
| α-D-Glucopyranose, 1,4: 3,6-dianhydro- | 0.101 | 0.515 |
| Arabinofuranose, 1,5-anhydro- | 0.103 | 0.524 |
| β-D-Xylofuranose, 1,5-anhydro- | 0.027 | 0.138 |
| unknown Anhydrosugar ** | 0.009 | 0.045 |
| poss: Anhydro-d-mannosan ** | 0.006 | 0.032 |
| unknown Dianhydrosugar ** | 0.014 | 0.069 |
| unknown Anhydrosugar ** | 0.005 | 0.024 |
| Levoglucosan; β-D-Glucopyranose, α-anhydro- | 0.118 | 0.600 |
| Benzene | 0.000 | 0.000 |
| Catechols | 0.020 | 0.103 |
| Hydroquinone; Benzene, 1,4-dihydroxy- | 0.020 | 0.103 |
| Aromatic Aldehydes | 0.000 | 0.000 |
| Aromatic Ketones | 0.000 | 0.000 |
| Lignin derived Phenols | 0.012 | 0.061 |
| Phenol | 0.012 | 0.061 |
| Guaiacols/Methoxy phenols | 0.000 | 0.000 |
| Syringols/Dimethoxy phenols | 0.028 | 0.144 |
| Syringol; Phenol, 2,6-dimethoxy- | 0.011 | 0.056 |
| Syringol, 4-ethyl- | 0.014 | 0.069 |
| Syringol, 4-vinyl- | 0.004 | 0.019 |
| Miscellaneous | 0.000 | 0.000 |
| Nitrogen containing compounds | 0.919 | 4.696 |
| Pyridine * | 0.008 | 0.043 |
| Pyrrole * | 0.011 | 0.055 |
| poss: Pyrazine, methyl- ** | 0.008 | 0.041 |
| 2-Pentanone, 4-amino-4-methyl- MW 100 * | 0.056 | 0.287 |
| similar to Pentanone, amino-methyl- (43, 58, 100) * | 0.106 | 0.543 |
| Acetamide * | 0.051 | 0.260 |
| Acetamide, N,N-dimethyl- ** | 0.005 | 0.027 |
| poss: Acetamide, N-methyl- ** | 0.005 | 0.027 |
| Propanamide * | 0.013 | 0.067 |

TABLE 2-continued

Detailed analysis of water-based phase

| Compound | Wet oil wt. % | Dry oil wt. % |
| --- | --- | --- |
| poss: Butanamide, 3-methyl- ** | 0.016 | 0.081 |
| Piperidone, tetramethyl- MW 155 *** | 0.009 | 0.047 |
| 2-Pyrrolidinone * | 0.067 | 0.341 |
| 2,5-Pyrrolidinone, 1-methyl- ** | 0.013 | 0.066 |
| poss: Pyridinone, dihydro-methyl- MW 111 ** | 0.006 | 0.031 |
| poss: Pentanamide, 4-methyl- ** | 0.004 | 0.022 |
| poss: Pyrrolidine, 1-acetyl- *** | 0.005 | 0.024 |
| poss: Pyrazole, 5-amino-3-methyl- **** | 0.004 | 0.021 |
| poss: Pyridinol, methyl- ** | 0.009 | 0.044 |
| poss: Pyridinol or homologous *** | 0.107 | 0.545 |
| poss: Pyrrolidinedione *** | 0.055 | 0.283 |
| poss: Pyridinol, methyl- * | 0.007 | 0.033 |
| unknown Triazine- or similar compound MW 113 **** | 0.012 | 0.059 |
| poss: Pyridin-carboxamide **** | 0.005 | 0.028 |
| unknown Pyrrolinone compound **** | 0.005 | 0.025 |
| unknown Hydantoin compound **** | 0.003 | 0.014 |
| poss: 2,4-Imidazolidinedione, 5-methyl- MW 114 *** | 0.062 | 0.315 |
| unknown Hydantoin compound **** | 0.018 | 0.091 |
| unknown Amide compound: base mass 72, 114 MW ? **** | 0.005 | 0.026 |
| unknown Hydantoin compound **** | 0.036 | 0.182 |
| poss: Hydantoin or imidazolidinedione compound: base mass 100 MW ? **** | 0.019 | 0.099 |
| unknown Piperazinedione compound **** | 0.004 | 0.022 |
| unknown Piperazinedione compound **** | 0.003 | 0.016 |
| unknown Pyrrolidin compound **** | 0.015 | 0.076 |
| unknown Pyrrolidin compound **** | 0.012 | 0.059 |
| poss: Pyrrol compound MW 154 **** | 0.039 | 0.199 |
| poss: Pyroglutamic acid **** | 0.013 | 0.067 |
| unknown Hydantoin compound **** | 0.012 | 0.061 |
| poss: Pyrrol compound: base mass 70, MW 154 **** | 0.011 | 0.057 |
| unknown Pyrrol compound **** | 0.006 | 0.030 |
| unknown Pyrrol compound **** | 0.052 | 0.263 |
| unknown Pyrrol compound **** | 0.011 | 0.058 |
| unknown Pyrrol compound **** | 0.012 | 0.061 |
| other unknown compounds | 0.059 | 0.304 |
| no MS peak found | 0.009 | 0.048 |
| no lib-spectrum found: base mass 57, MW 126 | 0.008 | 0.041 |
| unknown overlapping compounds | 0.012 | 0.062 |
| unknown overlapping compounds | 0.004 | 0.022 |
| overlapping compounds | 0.005 | 0.028 |
| no lib-spectrum found: base mass 99, 132 MW ? | 0.005 | 0.023 |
| no lib-spectrum found: base mass 42, MW ? | 0.009 | 0.047 |
| no lib-spectrum found: base masses 42, 98 MW ? | 0.004 | 0.019 |
| no lib-spectrum found: base masses 69, 112 MW 140 | 0.003 | 0.014 |

Figure 2:
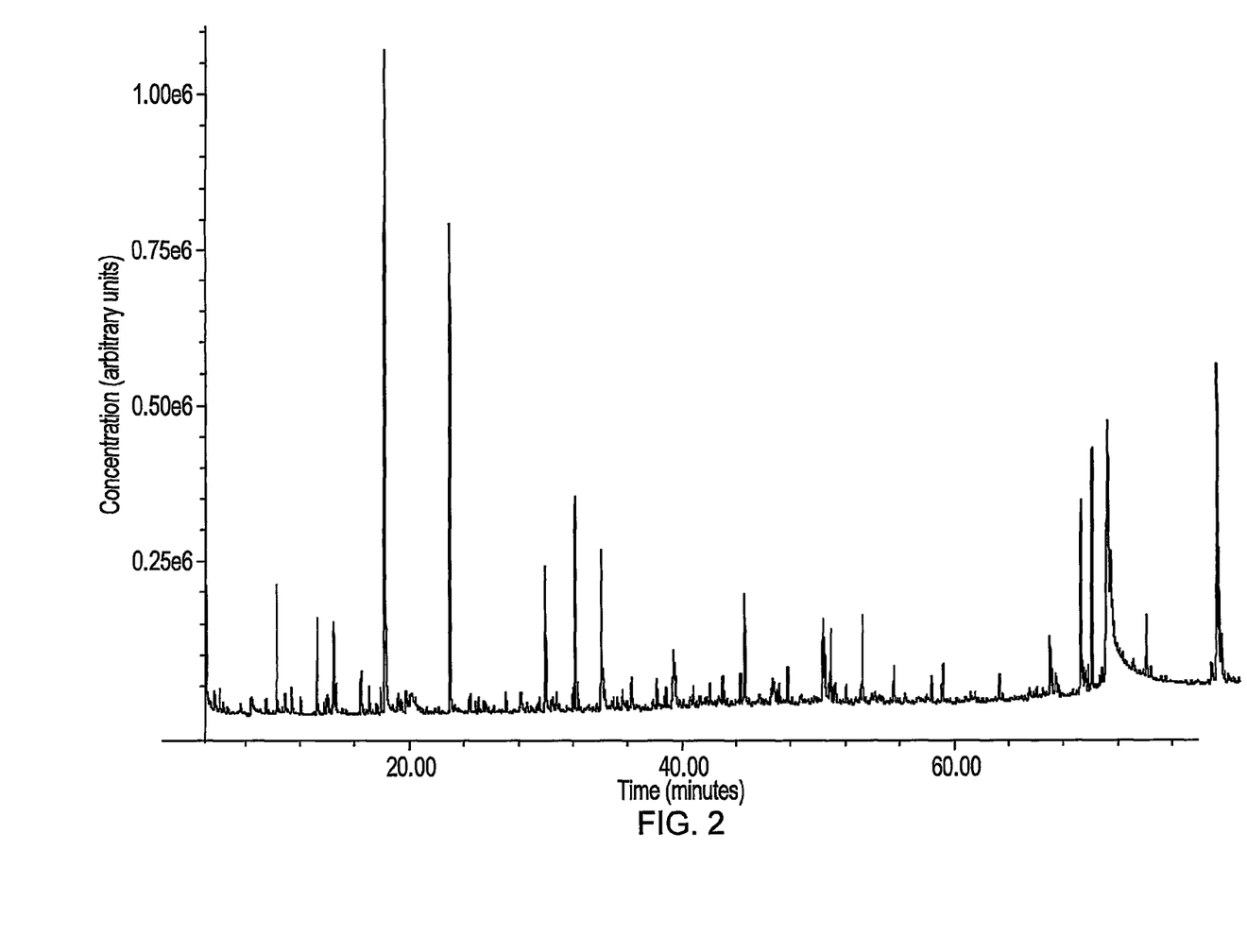
FIG. 2 shows a gas chromatography spectrum for the oily phase product of the same rapeseed biomass pyrolysis process as analysed in FIG. 1, the axes having a similar format to FIG. 1.

\* = from library search with high quality, no standard, RRF = 1
\*\* = isomeric or homologous compound, prefixes = ?, RRF = 1
\*\*\* = best library search spectrum, quality 50-70%, RRF = 1
\*\*\*\* = best library search spectrum, quality 40-50%, RRF = 1/no library spectrum found FIG. 2 shows a gas chromatography spectrum for the oily phase of the same rapeseed biomass pyrolysis product as analysed in FIG. 1. The water content of the oily phase was determined to be 28.13%. The results of analysis of the spectrum are set out in the following Tables 3 and 4:

TABLE 3

Summary of oily phase

| Substance group | wet oil wt. % | dry oil wt. % |
| --- | --- | --- |
| Acids | 0.218 | 0.303 |
| Nonaromatic Alcohols | 0.000 | 0.000 |
| Nonaromatic Aldehydes | 0.000 | 0.000 |
| Nonaromatic Ketones | 0.243 | 0.338 |
| Furans | 0.116 | 0.161 |
| Pyrans | 0.000 | 0.000 |
| Sugars | 0.000 | 0.000 |
| Benzene | 0.222 | 0.308 |
| Catechols | 0.042 | 0.059 |

TABLE 3-continued

Summary of oily phase

| Substance group | wet oil wt. % | dry oil wt. % |
| --- | --- | --- |
| Aromatic Aldehydes | 0.000 | 0.000 |
| Aromatic Ketones | 0.000 | 0.000 |
| Lignin derived Phenols | 0.822 | 1.144 |
| Guaiacols/Methoxy phenols | 0.040 | 0.056 |
| Syringols/Dimethoxy phenols | 0.350 | 0.487 |
| Nitrogen containing compounds | 3.267 | 4.546 |
| Homologous aliphatic chains | 1.951 | 2.715 |
| other unknown compounds | 0.788 | 1.096 |
| FID peak (no MS peak) | 0.096 | 0.133 |
| Miscellaneous | 0.000 | 0.000 |
| Total | 8.156 | 11.348 |

TABLE 4

Detailed analysis of oily phase

| Compound | wt. % | wt. % |
|---|---|---|
| Acids | 0.218 | 0.303 |
| Acetic acid | 0.218 | 0.303 |
| Nonaromatic Alcohols | 0.000 | 0.000 |
| Nonaromatic Aldehydes | 0.000 | 0.000 |
| Nonaromatic Ketones | 0.243 | 0.338 |
| Butanone, 2- | 0.046 | 0.064 |
| poss: 5-Hexene-2-one * | 0.025 | 0.034 |
| 3-Pentene-2-one, 4-methyl- * | 0.102 | 0.142 |
| 2-Cyclopenten-1-one, 2,3-dimethyl- | 0.071 | 0.099 |
| Furans | 0.116 | 0.161 |
| Furfuryl alcohol, 2- | 0.116 | 0.161 |
| Pyrans | 0.000 | 0.000 |
| Sugars | 0.000 | 0.000 |
| Benzene | 0.222 | 0.308 |
| Toluene | 0.122 | 0.169 |
| Benzene, ethyl- | 0.033 | 0.045 |
| Styrene | 0.040 | 0.056 |
| Benzene, butyl- * | 0.015 | 0.021 |
| Benzene, hexyl- * | 0.012 | 0.016 |
| Catechols | 0.042 | 0.059 |
| Hydroquinone; Benzene, 1,4-dihydroxy- | 0.042 | 0.059 |
| Aromatic Aldehydes | 0.000 | 0.000 |
| Aromatic Ketones | 0.000 | 0.000 |
| Lignin derived Phenols | 0.822 | 1.144 |
| Phenol | 0.227 | 0.316 |
| Cresol, o-; Phenol, 2-methyl- | 0.040 | 0.056 |
| Cresol, p-; Phenol, 4-methyl- | 0.230 | 0.320 |
| Cresol, m-; Phenol, 3-methyl- | 0.090 | 0.125 |
| Phenol, 2-ethyl- | 0.017 | 0.023 |
| Phenol, 2,4-dimethyl- | 0.064 | 0.089 |
| Phenol, 4-ethyl- | 0.049 | 0.069 |
| Phenol, ethyl-methyl- | 0.013 | 0.019 |
| Phenol, 4-vinyl- | 0.092 | 0.128 |
| Guaiacols/Methoxy phenols | 0.040 | 0.056 |
| Guaiacol, Phenol, 2-methoxy- | 0.040 | 0.056 |
| Syringols/Dimethoxy phenols | 0.350 | 0.487 |
| Syringol; Phenol, 2,6-dimethoxy- | 0.076 | 0.106 |
| Syringol, 4-ethyl- | 0.171 | 0.238 |
| Syringol, 4-vinyl- | 0.102 | 0.143 |
| Miscellaneous | 0.000 | 0.000 |
| Nitrogen containing compounds | 3.267 | 4.546 |
| Pyridine * | 0.022 | 0.031 |
| Pyridine, 2-methyl- * | 0.015 | 0.021 |
| Pyridine, dimethyl- MW 107 * | 0.007 | 0.010 |
| poss: Butanenitrile, 3-methyl- *** | 0.017 | 0.024 |
| unknown amine compound MW 99 **** | 0.043 | 0.060 |
| Pyrrole * | 0.108 | 0.150 |
| poss: Pyrazole compound MW 112 **** | 0.011 | 0.015 |
| Pentanenitrile, 4-methyl- * | 0.029 | 0.041 |
| similar to Pentanone, amino-methyl- (43, 58, 100) *** | 0.902 | 1.255 |
| poss: Pyrrole compound MW 137 **** | 0.123 | 0.171 |
| poss: Butanamide, 3-methyl- *** | 0.016 | 0.022 |
| poss: unknown Nitroso-phenyl compound MW 148 **** | 0.020 | 0.028 |
| poss: Piperidone, tetramethyl- MW 155 * | 0.237 | 0.330 |
| poss: unknown Nitroso-phenyl compound MW 162 **** | 0.020 | 0.028 |
| poss: Benzyl nitrile MW 117 *** | 0.039 | 0.055 |
| poss: 3-Pyridinol MW 95 *** | 0.100 | 0.139 |
| Benzenepropanenitrile MW 131 * | 0.024 | 0.033 |
| Indole MW 117 * | 0.122 | 0.170 |
| Indole, 3-methyl- MW 131 * | 0.047 | 0.066 |
| poss: 2,4-Imidazolidinedione, 5-methyl- MW 114 *** | 0.047 | 0.066 |
| poss: Phenylisocyanate, dimethy- **** | 0.021 | 0.029 |
| poss: unknown aliphatic Nitrile compound **** | 0.015 | 0.021 |
| poss: Hydantoin or imidazolidinedione compound: base mass 100 MW ? **** | 0.066 | 0.092 |
| poss: Hydantoin or imidazolidinedione compound: base mass 100 MW ? **** | 0.059 | 0.082 |
| poss: Hydantoin or imidazolidinedione compound: base mass 100 MW ? **** | 0.017 | 0.024 |
| poss: Pyrrol compound MW 154 **** | 0.033 | 0.045 |
| poss: Hydantoin or imidazolidinedione compound: base mass 100 MW ? **** | 0.016 | 0.023 |
| poss: Pyrrol compound: base mass 70, MW 154 **** | 0.284 | 0.395 |
| poss: unknown aliphatic Nitrile compound **** | 0.031 | 0.043 |
| unknown Pyrrol compound **** | 0.035 | 0.049 |
| aliphatic amide chain MW 212 *** | 0.078 | 0.109 |
| aliphatic amide chain MW ? *** | 0.598 | 0.832 |
| aliphatic amide compound MW 238 *** | 0.065 | 0.090 |
| Homologous aliphatic chains | 1.951 | 2.715 |
| unknown saturated aliphatic chain ** | 0.025 | 0.035 |

TABLE 4-continued

Detailed analysis of oily phase

| Compound | wt. % | wt. % |
|---|---|---|
| unknown saturated aliphatic chain ** | 0.016 | 0.022 |
| unknown unsaturated aliphatic chain MW ? ** | 0.022 | 0.030 |
| unknown saturated aliphatic chain ** | 0.014 | 0.020 |
| unknown unsaturated aliphatic chain MW ? ** | 0.023 | 0.032 |
| unknown saturated aliphatic chain ** | 0.021 | 0.029 |
| unknown unsaturated aliphatic chain MW ? ** | 0.023 | 0.032 |
| unknown unsaturated aliphatic chain MW ? ** | 0.023 | 0.031 |
| unknown unsaturated aliphatic chain MW ? ** | 0.027 | 0.037 |
| unknown aliphatic chain ** | 0.012 | 0.016 |
| unknown unsaturated aliphatic chain MW ? ** | 0.017 | 0.023 |
| unknown unsaturated aliphatic chain MW ? ** | 0.032 | 0.045 |
| unknown aliphatic chain ** | 0.018 | 0.025 |
| unknown saturated aliphatic chain ** | 0.014 | 0.020 |
| unknown unsaturated aliphatic chain ** | 0.024 | 0.033 |
| unknown saturated aliphatic chain ** | 0.033 | 0.046 |
| unknown saturated aliphatic chain ** | 0.016 | 0.022 |
| unknown unsaturated aliphatic chain ** | 0.035 | 0.049 |
| unknown aliphatic chain ** | 0.041 | 0.058 |
| unknown unsaturated aliphatic chain ** | 0.054 | 0.075 |
| unknown saturated aliphatic chain ** | 0.019 | 0.026 |
| unknown unsaturated aliphatic chain ** | 0.025 | 0.035 |
| poss: Heptadecene MW 238 * | 0.118 | 0.165 |
| Heptadecene isomere MW 238 * | 0.094 | 0.130 |
| unknown saturated aliphatic chain ** | 0.026 | 0.036 |
| poss: unknown aliphatic acid, methyl ester MW ? ** | 0.015 | 0.022 |
| Octadecenoic acid, methyl ester MW 222 * | 0.075 | 0.104 |
| unknown aliphatic chain ** | 0.032 | 0.045 |
| poss: Octadecenoic acid (Oleic acid) ** | 0.767 | 1.067 |
| unknown aliphatic chain ** | 0.033 | 0.045 |
| unknown aliphatic chain ** | 0.079 | 0.109 |
| unknown aliphatic chain ** | 0.181 | 0.251 |
| other unknown compounds | 0.788 | 1.096 |
| unknown compound: base mass 225, MW 240 **** | 0.016 | 0.022 |
| no library spectrum found: base mass 58 **** | 0.625 | 0.869 |
| no library spectrum found: base mass 42, 95 MW ? **** | 0.097 | 0.135 |
| no library spectrum found: base mass 93, MW 186 **** | 0.035 | 0.049 |
| no library spectrum found base mass 58 . . . 128, 200 **** | 0.015 | 0.020 |
| FID peak without MS peak | 0.096 | 0.133 |
| no MS peak found | 0.096 | 0.133 |

* = from library search with high quality, no standard, RRF = 1
** = homologous aliphatic compounds, MS = ?, RRF = 1
*** = best library search spectrum, quality 50-70%, RRF = 1
**** = best library search spectrum, quality 40-50%, RRF = 1/no library spectrum found These results show that the vapour phase products of the pyrolysis are rich in lignin pyrolyse product. These compounds are not considered to be particularly useful. Accordingly, it would be of benefit to reduce the fraction of these compounds and to increase the fraction of lower molecular weight organic compounds. In effect, it is particularly preferred to shift the peaks shown to the right of FIG. 2 further to the left—this corresponds with lower molecular weight organic compounds.

Figure 3:
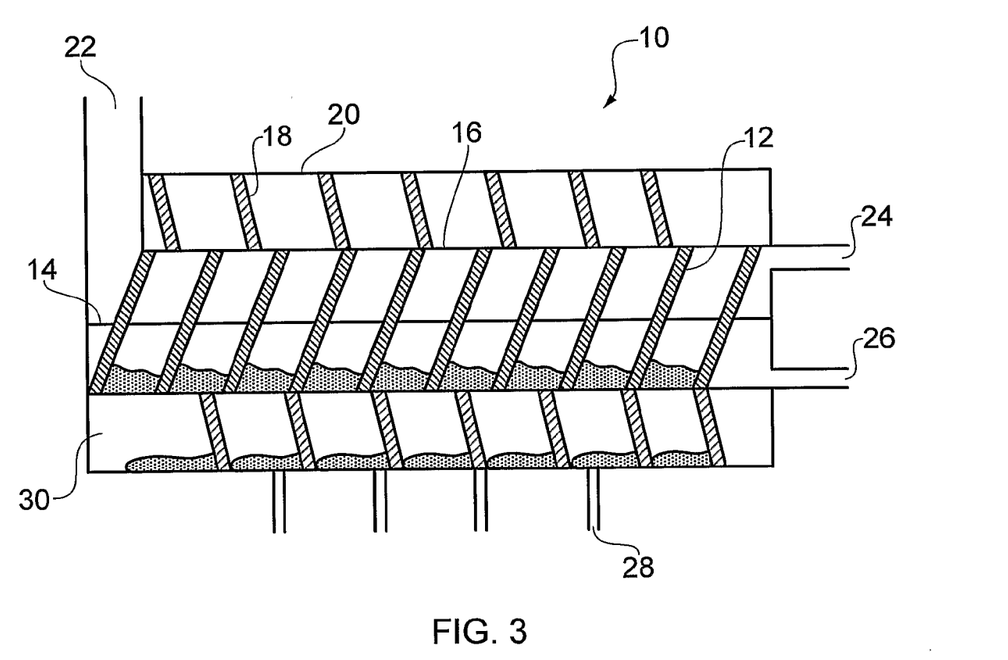
FIG. 3 show a schematic longitudinal cross sectional view of a pyrolysis apparatus according to a preferred embodiment of the invention.

The present inventors consider that one particularly suitable way to achieve this goal is to provide a pyrolysis process in which a large proportion of char is provided in relation to the biomass. It is particularly preferred to use a ratio of 1:3 biomass to char by weight in a continuous intermediate pyrolysis process. The char operates to provide useful sites for cracking reactions during the pyrolysis process, so that at least some of the higher organics molecules are broken down to lower molecular weight compounds. In addition, the char provides the opportunity for the formation of syngas using the large quantity of water vapour present in the biomass reactor, by the reaction:

FIG. 3 shows a schematic longitudinal cross sectional view of a pyrolysis apparatus 10 according to a preferred embodiment of the invention. The apparatus 10 includes a screw kiln having a first screw or auger 12 mounted on a rotatable shaft 14, the rotatable shaft 14 and first screw 12 rotating with respect to an inner cylindrical wall 16. Rotation of the first screw provides a means for conveying solids axially along the bore of the inner cylindrical wall 16. The inner cylindrical wall 16 has a second screw 18 fixed to its outer surface. Inner cylindrical wall 16 is also mounted for rotation in the contrary direction to the rotation of the rotatable shaft 14. Consequently, second screw 18 rotates with respect to an outer, fixed, cylindrical wall 20. Thus, rotation of the second screw provides a means for conveying solids axially along the space between the inner cylindrical wall 16 and the outer cylindrical wall 20.

In use, biomass feedstock is added into a feed inlet 22 which directs the biomass feedstock to one end of the first screw 12. The biomass feedstock is prevented from entering the space between the inner cylindrical wall 16 and the outer cylindrical wall 20.

At the start-up of the process, pre-formed char may be added to the biomass feedstock at the inlet 22 in order to achieve a preferred ratio by weight of biomass to char of 1:3.

The pyrolysis of the biomass takes place in the interior of the cylindrical space bounded by inner cylindrical wall 16. The biomass and char is mixed and conveyed along the cylindrical space by the first screw 12. At the end of the cylindrical space distal from the inlet 22, there is a vapour outlet 24 and an ash outlet 26. The vapour outlet conveys the vapour and gas phase products of the pyrolysis process. Preferably at least a portion of these products are conveyed to a gasifier apparatus (not shown) for further processing.

The pyrolysis process also produces char, in addition to the char that was present prior to the pyrolysis process. At least a portion of the char conveyed along the cylindrical space is allowed to fall via an aperture (not shown) into the annular space bounded by the inner cylindrical wall 16 and the outer cylindrical wall 20. The action of the second screw 18 conveys this char in the reverse direction along the annular space. Inlets 28 for air and water may be provided along this annular space. The purpose of these inlets is to introduce controlled amounts of air and/or water into the char in the annular space. The oxygen in the air allows a portion of the char to combust, producing $CO_2$ and heat. This heat drives the pyrolysis process (which is endothermic) in the cylindrical space. The introduction of water allows a reforming reaction to occur, producing syngas which can be extracted and used as a fuel for electricity generation. The water may be steam or vapour, e.g. from drying of the biomass.

The remainder of the char is conveyed back towards the inlet end of the apparatus. Using a paddle (not shown) or similar device, the char that reaches region 30 of the apparatus is lifted into the inlet end of the cylindrical space, in order to be conveyed along using the first conveyor.

In this way, the apparatus uses the char produced in pyrolysis as a heat carrier for subsequent pyrolysis, the high proportion of char to biomass promoting the formation of a greater proportion of useful gaseous products for power generation.

Waste heat from the apparatus may be used to dry biomass before inserting it into feed inlet 22.

In the case where the apparatus is heated with a heat transfer medium at a high temperature (e.g. gasifier gases at temperatures of about 800° C. or combustion gas products at temperatures of about 1000° C.), such a heat transfer medium may be applied to the external surface of outer cylindrical wall 20. Then, the char being conveyed by the second conveying means may act as a heat transfer buffer. The char then buffers the temperature "seen" by the pyrolysis reactor and by the fresh biomass being introduced into the pyrolysis reactor.

Although FIG. 3 shows the use of screw conveyor 12 to mix and convey the solid material in the central cylindrical space, the present inventors envisage alternative embodiments, such as an embodiment using one or more mixing ploughs to mix the char and the biomass feedstock, the reactor being heated by an external heat source (this embodiment is not illustrated). The ploughs operate to mix the solid content of the pyrolysis reactor, but do not provide a net conveyance of the solid content of the reactor, unlike the screw conveyor 12 of the embodiment illustrated in FIG. 3. When the system works in a continuous manner (as is preferred), the continuous addition of new biomass leads to the continuous formation of new char. An overflow for excess char is provided, in order that the ratio of biomass:char by weight can be maintained close to the ratio of 1:3. An outlet for the vapour and gas products is provided.

Figure 4:
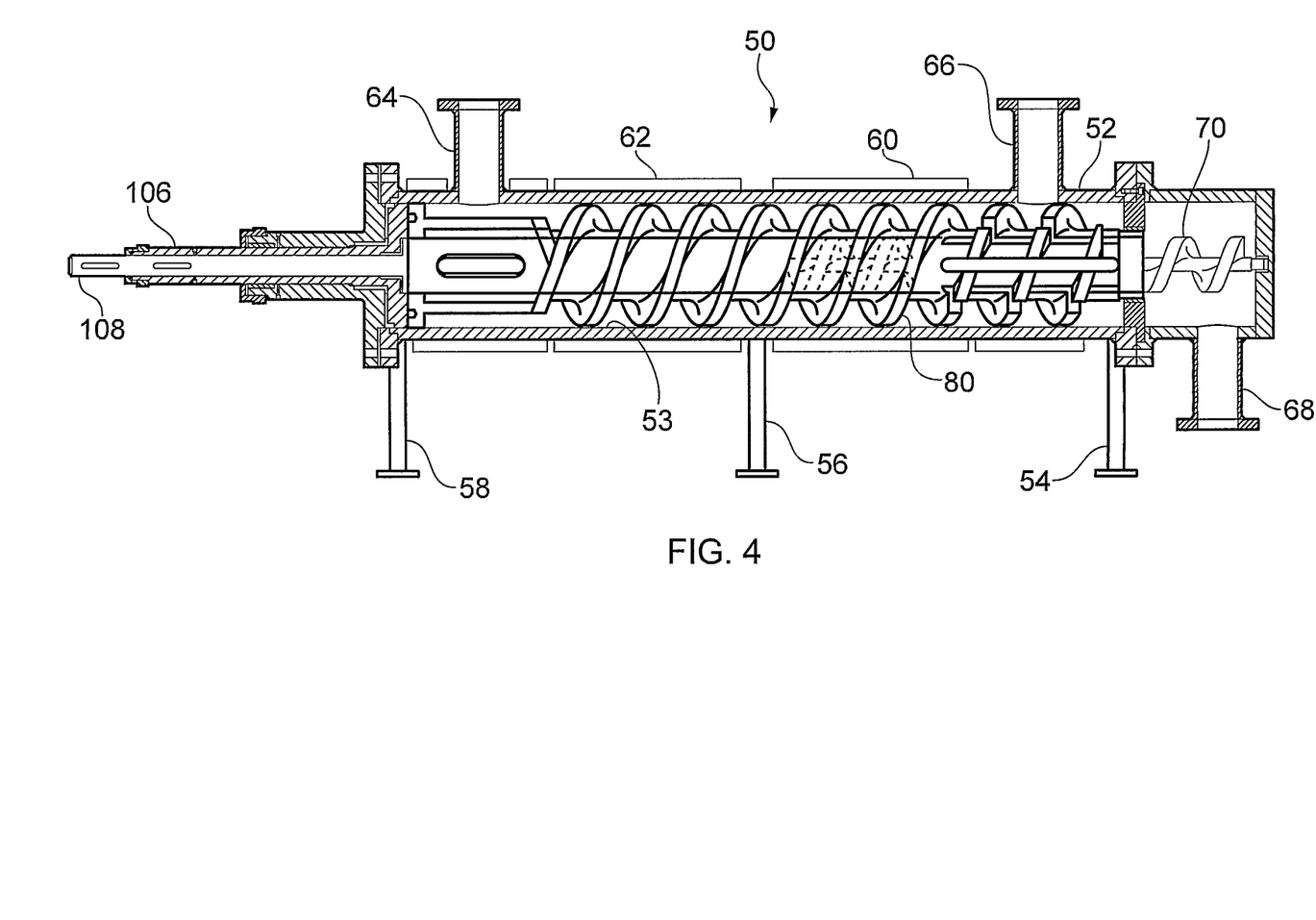
FIG. 4 shows a longitudinal schematic view of a further preferred embodiment of a pyrolysis apparatus according to the present invention.
Figure 5:
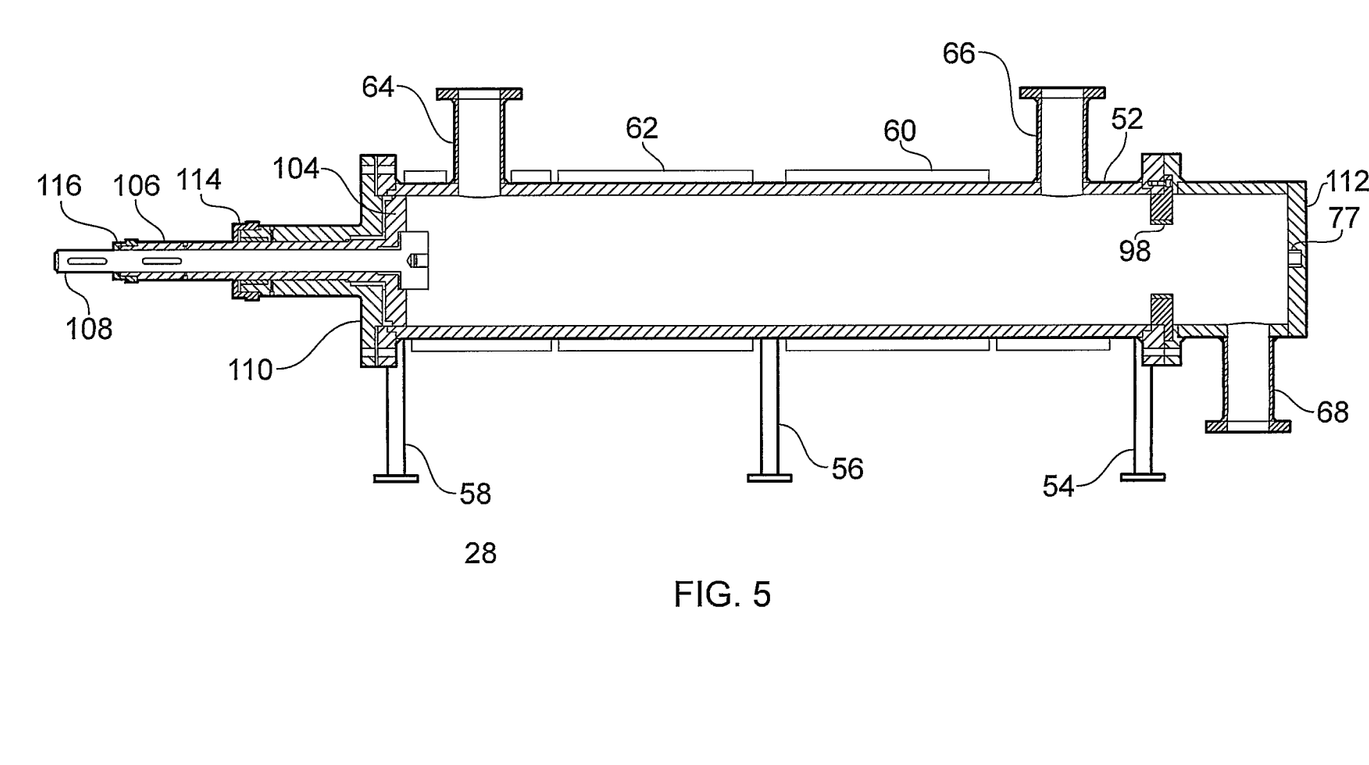
FIGS. 5-7 show longitudinal schematic views of the main components of the apparatus shown in FIG. 4.
Figure 6:
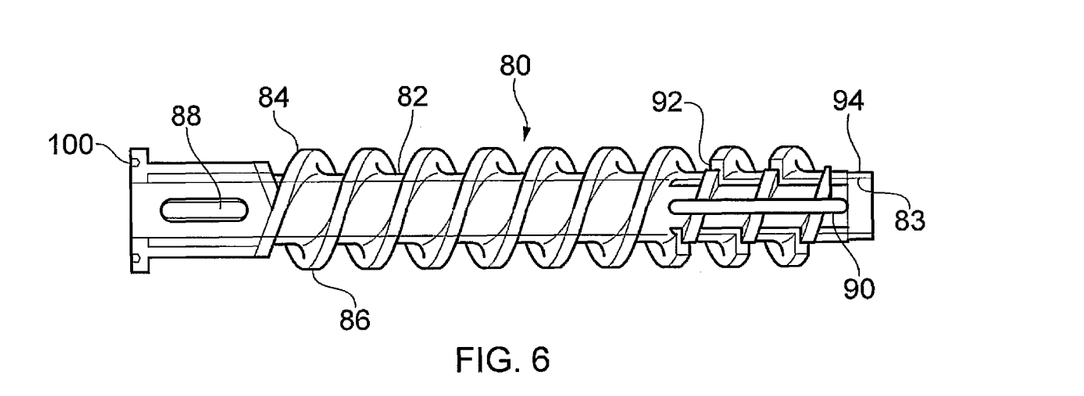
Figure 7:
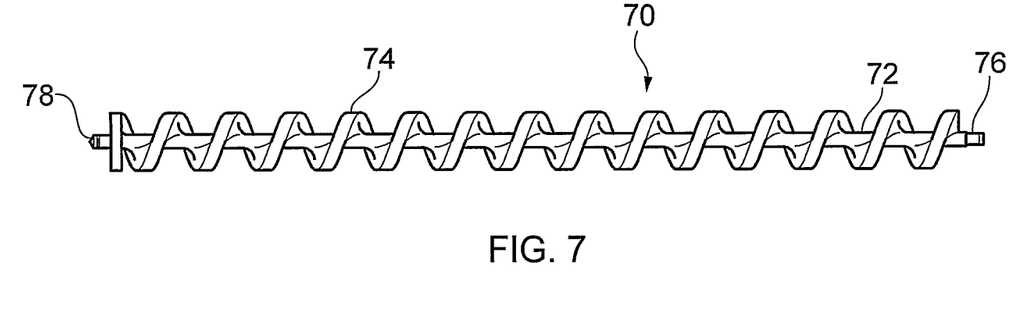

FIG. 4 shows a longitudinal schematic view of a further preferred embodiment of a pyrolysis apparatus according to the present invention. FIGS. 5-7 show longitudinal schematic views of the main components of the apparatus shown in FIG. 4, and so the features of these drawings will be described together.

The pyrolysis apparatus 50 of FIG. 4 includes an outer cylindrical wall 52 (see also FIG. 1). The apparatus is supported on supports 54, 56, 58 and has electric heating means, such as resistance elements 60, 62 formed around the outer cylindrical wall 52. In alternative embodiments (e.g. larger scale embodiments relying solely on combustion in order to provide the heat required to drive pyrolysis), there may instead be provided insulation around the outer cylindrical wall 52.

Towards a proximal end of the apparatus is provided a biomass inlet port 64. Towards a distal, opposite, end of the apparatus is provided a gas and vapour products outlet port 66. Also towards this distal end of the apparatus is provided a char outlet port 68.

Within the space enclosed by the outer cylindrical wall is provided a first screw auger 70 disposed within a second screw auger 80. These components are shown more clearly in FIGS. 7 and 6, respectively.

In FIG. 6, the second screw auger has a substantially tubular wall 82 with two helical screws 84, 86 extending along the outer surface of the tubular wall 82, from the proximal end to the distal end. These helical screws are adapted to scrape along the inner surface 53 of the outer cylindrical wall 52 of the apparatus, when the second screw auger is rotated within the apparatus.

At the proximal end of the second screw auger are provided feedstock inlet slots 88. In this embodiment, four feedstock inlet slots are provided, equispaced circumferentially and communicating through the tubular wall 82. Fewer or more inlets slots may be provided, as desired.

At the distal end of the second screw auger are provided outlet slots 90. These slots allow fluid and solid material to escape from the interior of the second screw auger. Corresponding slots 92 are provided in the helical screws, in order to avoid preventing solid material from escaping freely from the interior of the second screw auger.

At the distal extremity of the second screw auger is provided a bearing surface 94 for allowing rotation of the second screw auger in the apparatus. A corresponding bearing surface 98 is provided in the housing. At the proximal extremity of the second screw auger is provided engagement means (e.g. screw holes 100) to allow rotation of the second screw auger to be driven by a corresponding driving means (e.g. drive plate 104 and drive shaft 106). In FIG. 5, drive shaft 106 is coaxial with drive shaft 108, which is for driving the rotation of the first screw auger 70, described next.

First screw auger 70 includes a solid shaft 72 having a single helical screw 74 extending therealong. In use, the single screw engages with inner surface 83 of the tubular wall 82 of the second screw auger, in order to convey material along the interior of the second screw auger.

At the distal end of the first screw auger is provided a bearing surface 76, for rotational cooperation with a corresponding bearing surface 77 of the housing. At the proximal end of the first screw auger is provided engagement means 78 to allow rotation of the first screw auger to be driven by the corresponding drive shaft 108.

The housing includes a proximal end plate 110 and distal end plate 112. Proximal end plate 110 includes seal means 114 to provide a suitable seal between the proximal end plate 110 and the drive shaft 106. Further seal means 116 are provided to provide a suitable seal between the coaxial drive shafts 106 and 108.

In use, biomass feedstock (e.g. wood chips) and a heat carrier (e.g. metal balls, ceramic balls or SiC balls) are delivered to inlet 64. The second screw auger is rotated By rotation of drive shaft 106) in order to provide a conveying direction from the distal end to the proximal end. Thus, the biomass feedstock are not conveyed by the second screw auger.

Instead, the biomass feedstock and heat carrier gradually falls though the slots 88 in the proximal end of the second screw auger.

The first screw auger is rotated (by rotation of drive shaft 108) in order to provide a conveying direction from the proximal end to the distal end. Thus, the biomass feedstock and the heat carrier are conveyed and mixed along the interior of the second screw auger. This part of the apparatus is maintained at a temperature in the range 300-600° C. in order to subject the biomass feedstock to pyrolysis. Typically, this process produces char (solid) and gaseous products and vapour products. The products are able to escape from the interior of the second screw auger via slots 90. The vapour and gaseous products are extracted from the apparatus via outlet 66. Some of the char and the heat carrier fall through slots 90 and are conveyed back along the apparatus (i.e. from the distal and to the proximal end) by the second auger. The remainder of the char is conveyed to outlet 68. This char may be recycled and used as heat carrier, or may alternatively be used in combustion to provide heat for the pyrolysis, or may still further be used for combustion in a CHP process.

In alternative embodiments, the heat carrier (typically balls) my be substantially prevented from falling though slots 90 and may instead be conveyed to outlet 68. In this case, some or all of the heat carrier balls may be recycled for use again at the inlet 64 of the apparatus.

It should be noted that in other embodiments, the double helical system described with respect to FIGS. 4-7 need not be used. For example, two separate (but preferably adjacent) helical screws may be used as the first and second conveying means.

The apparatus 50 may be connected to an inlet of a gasifier apparatus. In particular, it may be advantageous to connect the outlet 66 of the apparatus to an inlet of a gasifier apparatus. For example, the gasifier may itself consume biomass feedstock such as wood chips. The outlet 66 from the pyrolysis apparatus may be provided to the pyrolysis zone of the gasifier. This provides benefits to the gasification process. In particular, it provides substantially ash-free pyrolysis vapours (and water) into the correct location in the gasifier to improve the efficiency of the gasifier. It is considered that this can potentially double the throughput for the same size downdraft gasifier.

Alternatively, the pyrolysis apparatus may be integrated with the gasifier apparatus. In this way, heat generated by the gasification process may provide the heat necessary to drive the pyrolysis in the pyrolysis apparatus.

The pyrolysis apparatus may operate at an internal pressure above atmospheric pressure. For example, the pyrolysis apparatus may operate at 200-300 mbar over atmospheric pressure. This allows the vapour pyrolysis products effectively to be pumped into the gasifier apparatus, driven by the over pressure.

The pyrolysis apparatus may be pressurised from, e.g. 3 mbar for some applications, or up to about 30 bar for other applications. This allows coupling to a gasifier with its pressure drop. In place of the gasifier, or additional to the gasifier, the pyrolysis apparatus may be coupled to other pressurised reactors, such as a reformer or a hydrogenation system.

Figure 8:
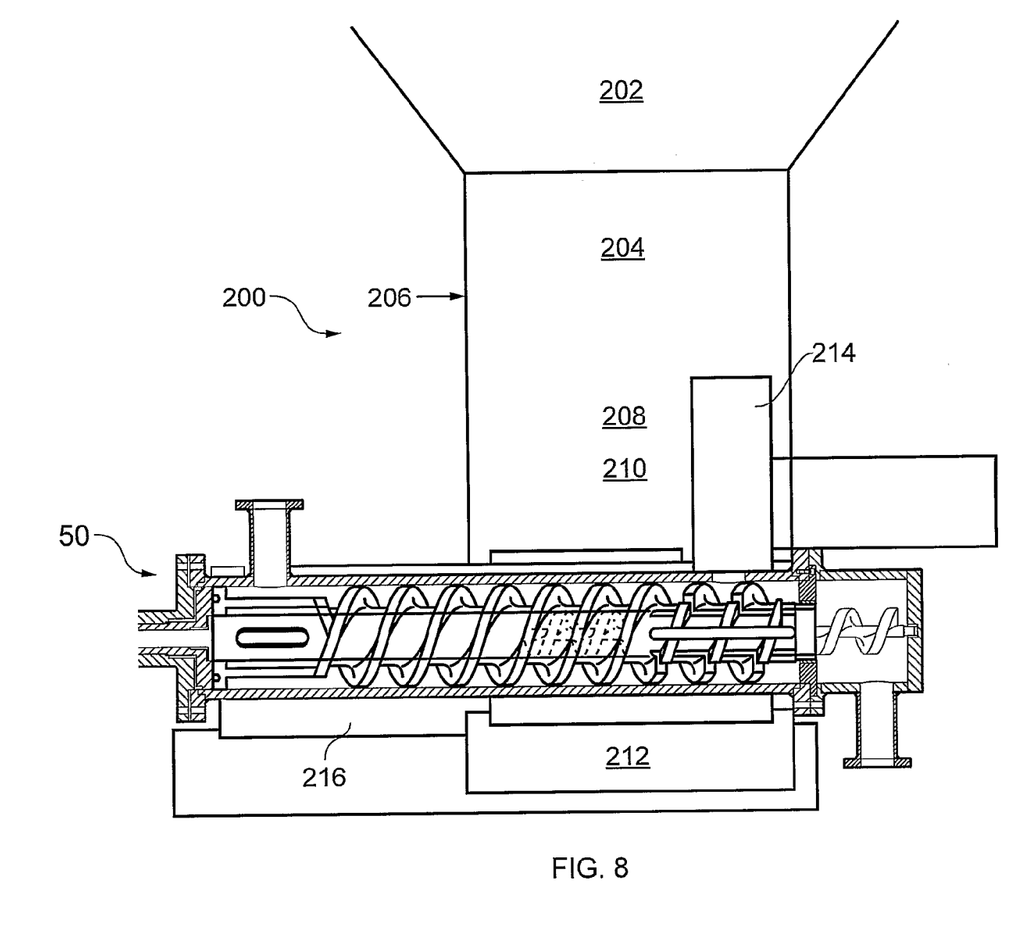
FIG. 8 shows a schematic view of a pyrolysis apparatus integrated with a gasifier apparatus.

FIG. 8 shows a schematic view of a pyrolysis apparatus 50 integrated with a gasifier apparatus 200. The gasifier apparatus 200 includes an inlet 202 for biomass, typically wood-based biomass. The biomass is gravity-fed into a pyrolysis zone 204 of the gasifier, there being an air inlet 206 slightly below the pyrolysis zone 204. Below the air inlet in the gasifier is a reforming and gasification zone 208, above a char bed 210. At the base of the gasifier apparatus is ash section 212.

Outlet 66 of the pyrolysis apparatus 50 transfers pyrolysis vapour from the pyrolysis apparatus into the gasification zone 208, via duct 214. The gasifier has an outlet 216 for syngas generated by the gasifier.

The preferred embodiments have been described by way of example only. Modifications of these embodiments, further embodiments and modifications thereof will be apparent to the skilled person and as such are within the scope of the present invention.

The invention claimed is:

1. A biomass pyrolysis process including the steps:
conveying by a first conveying means biomass feedstock and heat transfer medium from a biomass feedstock input port and heat transfer medium input ports through a pyrolysis zone of a biomass pyrolysis apparatus to produce at least solid and gaseous biomass pyrolysis products; and
conveying by a second conveying means at least a portion of the solid products from an output port of the pyrolysis zone back to the heat transfer medium input port, wherein the second conveying means conveys at least a portion of the solid products through the biomass pyrolysis apparatus and is disposed in thermal contact with the first conveying means at the pyrolysis zone within the biomass pyrolysis apparatus, and wherein the first and second conveying means are located with respect to each other so that one of them surrounds at least part of the other or so that they are adjacent to each other.

2. A biomass pyrolysis process according to claim 1 wherein the heat transfer medium includes solid heat carrier balls.

3. A biomass pyrolysis process according to claim 1, wherein vapour and/or gaseous products of the biomass pyrolysis process are provided to an inlet of a biomass gasification process.

4. A biomass pyrolysis process according to claim 3 wherein the pyrolysis process is carried out at a pressure over atmospheric pressure of at least 50 mbar.

5. A biomass pyrolysis apparatus having:
a biomass feedstock input port;
a heat transfer medium input port;
a first conveying means for conveying the biomass feedstock and heat transfer medium through a pyrolysis zone of the apparatus;
an output port for solid products of the biomass pyrolysis; and
a second conveying means for conveying at least a portion of the solid products of the biomass pyrolysis back to the heat transfer medium input port, so that the heat transfer medium includes said solid products of the biomass pyrolysis,
wherein the second conveying means conveys at least a portion of the solid products through the biomass pyrolysis apparatus and is disposed in thermal contact with the first conveying means at the pyrolysis zone within the biomass pyrolysis apparatus, and wherein the first and second conveying means are located with respect to each other so that one of them surrounds at least part of the other or so that they are adjacent to each other.

6. A biomass pyrolysis apparatus according to claim 5 wherein the second conveying means is disposed annularly around the first conveying means.

7. A biomass pyrolysis apparatus according to claim 5, further having an air and/or water inlet for introducing air and/or water into the second conveying means for reaction with the char conveyed by the second conveying means.

8. A biomass pyrolysis apparatus according to claim 5 wherein the heat transfer medium includes solid heat carrier balls.

9. A biomass pyrolysis apparatus according to claim 5, further comprising a biomass gasification apparatus, wherein vapour and/or gaseous products of the biomass pyrolysis are provided to an inlet of the biomass gasification apparatus.

10. A biomass pyrolysis apparatus according to claim 9, wherein the pyrolysis apparatus is adapted to carry out pyrolysis at a pressure over atmospheric pressure of at least 3 mbar.

11. A biomass pyrolysis process according to claim 1 wherein the second conveying means disposed annularly around the first conveying means.

12. A biomass pyrolysis process according to claim 1 wherein the pyrolysis zone of the biomass pyrolysis apparatus is a screw/auger kiln.

13. A biomass pyrolysis process according to claim 1 wherein said solid products of pyrolysis include char, and wherein the heat transfer medium at least partly comprises char.

14. A biomass pyrolysis process according to claim 13 wherein the ratio by weight of biomass to char is 1:1 to 1:20.

\* \* \* \* \*